US012067890B2

(12) United States Patent
Peukert et al.

(10) Patent No.: US 12,067,890 B2
(45) Date of Patent: Aug. 20, 2024

(54) REDUCED ENGINE TAXI PREDICTOR

(71) Applicant: THE BOEING COMPANY, Chicago, IL (US)

(72) Inventors: Markus F. Peukert, Hessen (DE); Garoe Gonzalez, Frankfurt (DE); Samantha A. Schwartz, Castle Pines, CO (US)

(73) Assignee: The Boeing Company, Chicago, IL (US)

( * ) Notice: Subject to any disclaimer, the term of this patent is extended or adjusted under 35 U.S.C. 154(b) by 208 days.

(21) Appl. No.: 16/877,912

(22) Filed: May 19, 2020

(65) Prior Publication Data

US 2021/0366297 A1 Nov. 25, 2021

(51) Int. Cl.
*G08G 5/00* (2006.01)
*G08G 5/06* (2006.01)

(52) U.S. Cl.
CPC ........... *G08G 5/065* (2013.01); *G08G 5/0013* (2013.01); *G08G 5/0078* (2013.01); *G08G 5/0091* (2013.01)

(58) Field of Classification Search
CPC .... G08G 5/065; G08G 5/0013; G08G 5/0078; G08G 5/0091; G08G 5/0021
See application file for complete search history.

(56) References Cited

U.S. PATENT DOCUMENTS

2016/0349752 A1* 12/2016 Fusaro ................. G05D 1/0202
2019/0213897 A1* 7/2019 Jayathirtha ............ B64D 45/00

OTHER PUBLICATIONS

Michael W. Wells, Reduced-Engine Taxi: a Cost-Savings Exploration, Jun. 2017, Air Force Institute of Technology (Year: 2017).*
Koudis, G.S. et al.; article entitled: The impact of single engine taxiing on aircraft fuel consumption and pollutant emissions; The Aeronautical Journal; Dec. 2018; pp. 1967-1984; vol. 122, No. 1258; 10.1017/aer.2018.117; Cambridge University Press.
Ravizza, S. et al.; article entitled: The trade-off between taxi time and fuel consumption in airport ground movement; Public Transport; Feb. 2013; pp. 25-40; vol. 5; 10.1007/s12469-013-0060-1; Springer-Verlag Berlin Heidelberg.

* cited by examiner

*Primary Examiner* — Joan T Goodbody
(74) *Attorney, Agent, or Firm* — Quinn IP Law

(57) ABSTRACT

A method of supporting taxi operation of an aircraft with multiple engines is provided. The method includes receiving information indicating a predicted duration of a taxi operation of a flight of the aircraft and weather conditions at the airport and determining whether a reduced-engine taxi operation (RETO) of the aircraft is permitted based on the predicted taxi duration and the weather conditions. When RETO is permitted, the method further includes determining a fuel savings of RETO in which at least a portion of the taxi operation is performed with less than all of the engines running, relative to a normal taxi operation in which the taxi operation is performed with all of the engines running and outputting a recommendation of RETO or normal taxi operation to a display device onboard the aircraft, the recommendation of RETO when the fuel savings is at least a given minimum fuel savings.

17 Claims, 7 Drawing Sheets

REDUCED ENGINE TAXI PREDICTOR

TECHNOLOGICAL FIELD

The subject disclosure relates generally to the taxi operations of an aircraft and, in particular, to supporting an aircraft in a reduced-engine taxi operation (RETO).

BACKGROUND

The use of aircraft and airports to move people, goods, supplies, and other objects across the country and around the world has become central aspect of modern travel, commerce, and everyday life. Increases in the use of airports tends to compound many of the technical challenges associated with safely and efficiently operating an airport and managing air traffic. Increases in the use of airports also tends to increase the amount of time aircraft spend in taxi operations, which in turn impacts the technical challenges associated with reducing fuel burn during an aircraft's landing and takeoff (LTO) cycle.

Reduced engine taxi operation (RETO), where a multiple-engine aircraft uses less than all of its engines during at least a portion of the time the plane is taxiing to or from a runway, represents one approach to reducing fuel burn during and LTO cycle. However, numerous technical and operational challenges, such as the complexity of the factors impacting fuel savings, engine warm-up and cool-down durations, airport procedural constraints, and dynamic traffic conditions limit the ability of pilots and other individuals to use RETO to reduce fuel burn.

BRIEF SUMMARY

Example implementations of the subject disclosure are directed to supporting an aircraft in a reduced-engine taxi operation (RETO). RETO involves a multiple-engine aircraft using less than all of its engines during at least some of the taxi operations performed as part of the aircraft's landing and takeoff (LTO) cycle. While RETO can result in fuel savings in a given LTO cycle, there are multiple factors that impose technical challenges that can result in the reduction or elimination of those fuel savings. For example, weather conditions, the routing of the relevant taxiway(s) at the airport, the standard operating procedures (SOP) and other aspects of the airport (such as gate and runway information), taxi queue duration, standing time, aircraft type, engine warm-up and cool-down durations, information about the aircraft's auxiliary power unit, and the like can all impact whether, when, and how RETO should be performed in a given situation to ensure proper operation of the aircraft, adherence to airport directives, and effective use of RETO.

To overcome these and other technical challenges, example implementations of the subject disclosure use received information associated with the taxi operation of a flight of the aircraft and/or other factors impacting RETO, and determines whether and when RETO is permitted based on the received information. In situations where RETO is permitted, example implementations determine a fuel savings of RETO (where at least a portion of the relevant taxi operation is performed with less than all of the multiple engines of the aircraft running) compared to a normal taxi operation, where all engines remain running throughout the taxi operation. Upon determining that RETO would result in at least a threshold fuel savings, a recommendation of RETO is then presented via a display device onboard the aircraft.

The subject disclosure thus includes, without limitation, the following example implementations.

Some example implementations provide a method of supporting taxi operation of an aircraft at an airport, the aircraft with fuel-consuming systems including multiple engines, the method comprising: receiving information that indicates a predicted taxi duration of a taxi operation of a flight of the aircraft, and that indicates weather conditions at the airport; determining whether a reduced-engine taxi operation (RETO) of the aircraft is permitted based on the predicted taxi duration and the weather conditions; and when RETO of the aircraft is permitted, determining a fuel savings of RETO in which at least a portion of the taxi operation is performed with less than all of the multiple engines of the aircraft running, relative to a normal taxi operation in which the taxi operation is performed with all of the multiple engines of the aircraft running; and outputting a recommendation of RETO or normal taxi operation to a display device onboard the aircraft, the recommendation of RETO when the fuel savings is at least a given minimum fuel savings.

In some example implementations of the method of any preceding example implementation, or any combination of any preceding example implementations, the information includes standard operations procedures (SOP) of the airport, and determining whether RETO of the aircraft is permitted includes determining whether the airport permits RETO from the SOP.

In some example implementations of the method of any preceding example implementation, or any combination of any preceding example implementations, the information indicates the predicted taxi duration including a queue duration in which the aircraft is standing, and the information further indicates an engine-warmup duration, and an aircraft weight, and determining the fuel savings comprises: applying the predicted taxi duration, the queue duration and the aircraft weight to first models trained to predict and thereby produce first predictions of fuel burn for respective ones of the fuel-consuming systems for normal taxi operation; applying the predicted taxi duration, the queue duration, the engine-warmup duration and the aircraft weight to second models trained to predict and thereby produce second predictions of fuel burn for respective ones of the fuel-consuming systems for RETO; calculating a first prediction of total fuel burn for normal taxi operation from the first predictions, and a second prediction of total fuel burn for RETO from the second predictions; and determining a difference between the first prediction of total fuel burn and the second prediction of total fuel burn that indicates the fuel savings of RETO relative to normal taxi operation.

In some example implementations of the method of any preceding example implementation, or any combination of any preceding example implementations, the fuel-consuming systems of the aircraft also include an auxiliary power unit (APU), the first models are trained to predict and thereby produce the first predictions of fuel burn for respective ones of the multiple engines and the APU for normal taxi operation, and the second models are trained to predict and thereby produce the second predictions of fuel burn for respective ones of the multiple engines and the APU for RETO.

In some example implementations of the method of any preceding example implementation, or any combination of any preceding example implementations, the taxi operation is a taxi-out operation that includes taxi of the aircraft from a given gate to a given runway of the airport, and the information further indicates the airport, the given gate, and the given runway, and the first models and the second models are specific to the airport, the given gate and the given runway, the first models trained to predict and thereby produce the first predictions of fuel burn for respective ones of the fuel-consuming systems for normal taxi operation from the given gate to the given runway, and the second models trained to predict and thereby produce the second predictions of fuel burn for respective ones of the fuel-consuming systems for RETO from the given gate to the given runway.

In some example implementations of the method of any preceding example implementation, or any combination of any preceding example implementations, the aircraft is of a given type of aircraft, and the first models and the second models are specific to the given type of aircraft, the first models trained to predict and thereby produce the first predictions of fuel burn for respective ones of the fuel-consuming systems for normal taxi operation of the given type of aircraft, and the second models trained to predict and thereby produce the second predictions of fuel burn for respective ones of the fuel-consuming systems for RETO of the given type of aircraft.

In some example implementations of the method of any preceding example implementation, or any combination of any preceding example implementations, outputting the recommendation includes outputting the recommendation in a graphical user interface (GUI) that also indicates the second predictions of fuel burn for respective ones of the fuel-consuming systems when the recommendation is RETO, and that indicates the first predictions of fuel burn for respective ones of the fuel-consuming systems when the recommendation is normal taxi operation.

In some example implementations of the method of any preceding example implementation, or any combination of any preceding example implementations, the taxi operation is a taxi-out operation, and the information further indicates a pushback time of the aircraft from a gate of the airport, and an engine-warmup duration, and the method further comprises determining start times for respective ones of the multiple engines from the pushback time, and further from the predicted taxi time and the engine-warmup duration when the recommendation is RETO, and outputting the recommendation includes outputting the recommendation in a graphical user interface (GUI) that also indicates the start times for respective ones of the multiple engines.

Some example implementations provide an apparatus for supporting taxi operation of an aircraft at an airport, the aircraft with fuel-consuming systems including multiple engines, the apparatus comprising a memory configured to store computer-readable program code; and processing circuitry configured to access the memory, and execute the computer-readable program code to cause the apparatus to at least perform the method of any preceding example implementation, or any combination of any preceding example implementations.

Some example implementations provide a computer-readable storage medium for supporting taxi operation of an aircraft at an airport, the aircraft with fuel-consuming systems including multiple engines, the computer-readable storage medium being non-transitory and having computer-readable program code stored therein that, in response to execution by processing circuitry, causes an apparatus to at least perform the method of any preceding example implementation, or any combination of any preceding example implementations.

These and other features, aspects, and advantages of the subject disclosure will be apparent from a reading of the following detailed description together with the accompanying figures, which are briefly described below. The subject disclosure includes any combination of two, three, four or more features or elements set forth in this disclosure, regardless of whether such features or elements are expressly combined or otherwise recited in a specific example implementation described herein. This disclosure is intended to be read holistically such that any separable features or elements of the disclosure, in any of its aspects and example implementations, should be viewed as combinable unless the context of the disclosure clearly dictates otherwise.

It will therefore be appreciated that this Brief Summary is provided merely for purposes of summarizing some example implementations so as to provide a basic understanding of some aspects of the disclosure. Accordingly, it will be appreciated that the above described example implementations are merely examples and should not be construed to narrow the scope or spirit of the disclosure in any way. Other example implementations, aspects and advantages will become apparent from the following detailed description taken in conjunction with the accompanying figures which illustrate, by way of example, the principles of some described example implementations.

BRIEF DESCRIPTION OF THE FIGURE(S)

Having thus described example implementations of the disclosure in general terms, reference will now be made to the accompanying figures, which are not necessarily drawn to scale, and wherein:

DETAILED DESCRIPTION

Figure 1:
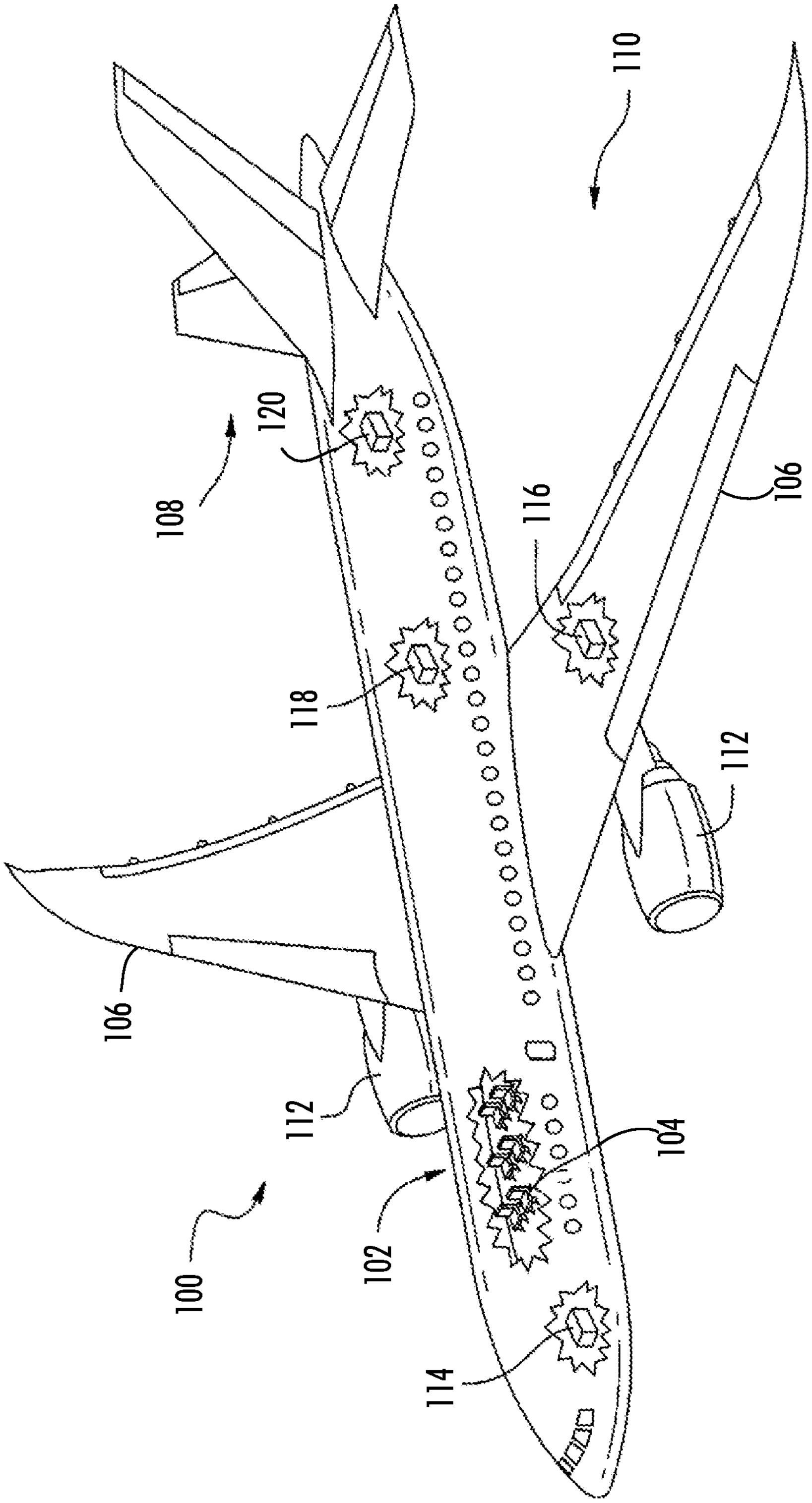
FIG. 1 illustrates an aircraft that can benefit from example implementations of the subject disclosure.

Some implementations of the subject disclosure will now be described more fully hereinafter with reference to the accompanying figures, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art. For example, unless otherwise indicated, reference something as being a first, second or the like should not be construed to imply a particular order. Also, something may be described as being above something else (unless otherwise indicated) may instead be below, and vice versa; and similarly, something described as being to the left of something else may instead be to the right, and vice versa. Like reference numerals refer to like elements throughout.

Example implementations of the subject disclosure are directed to supporting an aircraft in a reduced-engine taxi operation (RETO). As discussed and otherwise disclosed herein, RETO involves a multiple-engine aircraft using less than all of its engines during at least a portion of the taxi operations performed as part of the aircraft's landing and takeoff (LTO) cycle. Since multiple, complex factors impose technical challenges impacting the ability for RETO to result in fuel savings, it is often impossible for pilots or other individuals to account for one or more of those factors and determine whether, when, and how RETO should be used in a given taxi operation within the time limits associated with a taxi operation and while also engaging in the other actions necessary for the proper operation of the aircraft. For example, weather conditions, the routing of the relevant taxiway(s) at the airport, the standard operating procedures (SOP) and other aspects of the airport (such as gate and runway information), taxi queue duration, standing time, aircraft type, engine warm-up and cool-down durations, information about the aircraft's auxiliary power unit, and the like can all impact whether, when, and how RETO should be performed in a given situation to ensure proper operation of the aircraft, adherence to airport directives, and effective use of RETO.

To overcome these and other technical challenges, example implementations of the subject disclosure use received information associated with the taxi operation of a flight of the aircraft and/or other factors impacting RETO, and determines whether and when RETO is permitted based on the received information. In situations where RETO is permitted, example implementations determine a fuel savings of RETO (where at least a portion of the relevant taxi operation is performed with less than all of the multiple engines of the aircraft running) compared to a normal taxi operation, where all engines remain running throughout the taxi operation. Some example implementations involve applying one or more aspects of the received information to two models—one trained to predict and produce predictions of fuel burn (e.g., estimated amount of fuel utilized) for the fuel-consuming systems during normal taxi operations and a second trained to predict and produce predictions for the fuel-consuming system during RETO. Upon determining that RETO would result in at least a threshold fuel savings, a recommendation of RETO is then presented via a display device onboard the aircraft.

FIG. 1 illustrates an aircraft 100 that can benefit from example implementations of the subject disclosure. As shown, the aircraft includes an airframe 102 with a fuselage 104, wings 106 and tail 108. The aircraft also includes a plurality of high-level systems 110 such as a propulsion system. In the particular example shown in FIG. 1, the propulsion system includes two wing-mounted engines 112. In other implementations, the propulsion system can include other arrangements, for example, engines carried by other portions of the aircraft including the fuselage and/or the tail. The high-level systems can also include an electrical system 114, hydraulic system 116 and/or environmental system 118. Any number of other systems can be included, such as an auxiliary power unit (APU) 120 for example.

Figure 2:
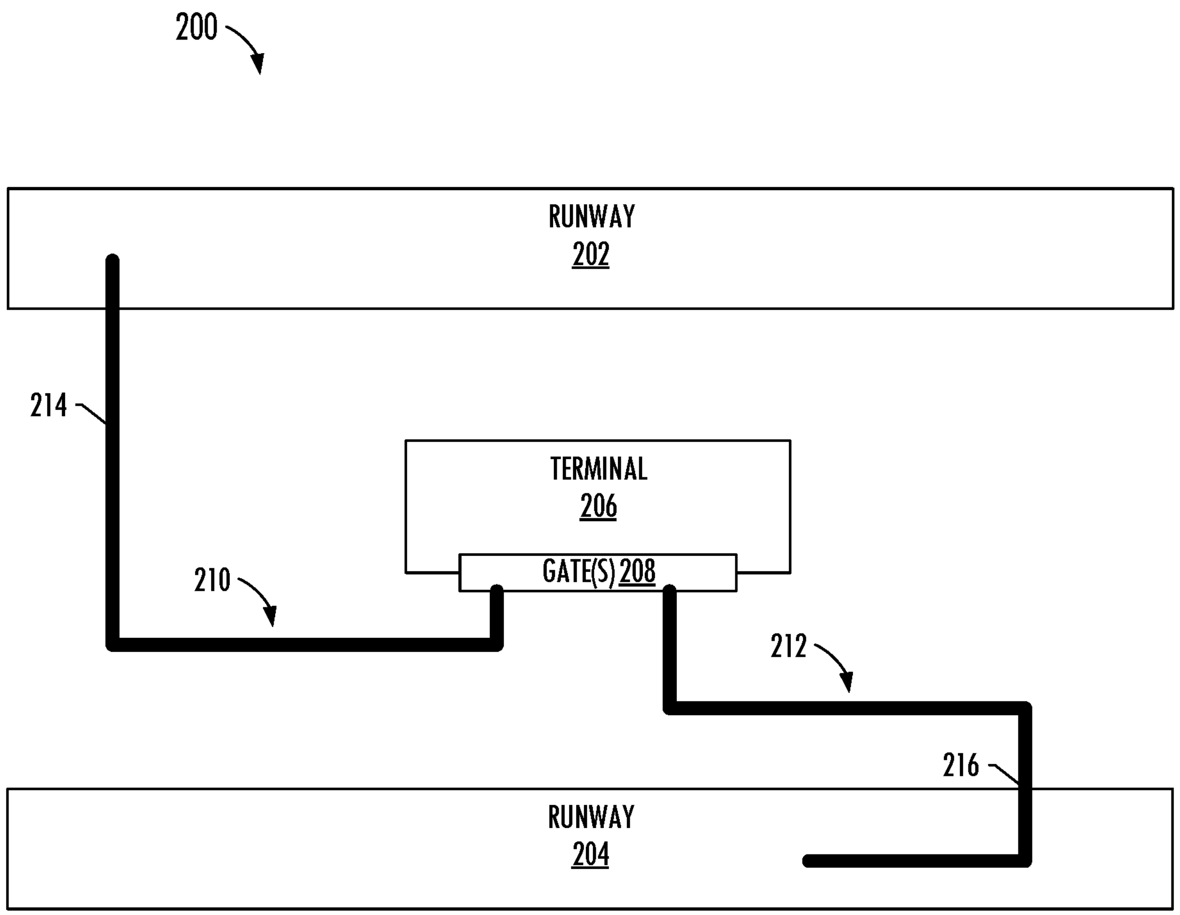
FIG. 2 is a block diagram of an airport illustrating aspects of the subject disclosure.

FIG. 2 is a block diagram of an airport 200 illustrating aspects of the subject disclosure. It will be appreciated that the airport shown in FIG. 2 is a simplified example presented for the purposes of illustrating aspects of the subject disclosure and clarifying certain terms and concepts presented herein, and should not be interpreted as limiting the subject disclosure to any particular airport or airport configuration.

As shown in FIG. 2, the airport 200 includes a runway 202, which can be used by departing aircraft (such as aircraft 100, for example) for takeoff operations, and another runway 204, which can be used by arriving aircraft (such as aircraft 100, for example) for landing operations. The airport also includes at least one terminal 206, and the terminal has one or more gates 208 at which the aircraft can stand while passengers and/or cargo board or deplane the aircraft.

FIG. 2 also shows a taxiway 210 leading from the gates 208 to the runway 202 and another taxiway 212 leading from the runway 204 to the gates. As discussed and otherwise disclosed here, example implementations of the subject disclosure support taxi operations of an aircraft 100 at an airport 200 by receiving various information relevant to the taxi operations of an aircraft, determining whether a RETO of the aircraft is permitted, determining a fuel savings of RETO with respect to normal taxi operations, and outputting a recommendation to a display device on the aircraft 100 based on the fuel savings. Some example implementations overcome technical challenges associated with reducing delays caused by engine warmup and cool down durations and/or improving the fuel savings of a RETO operation by determining and providing a recommendation regarding a time and/or position at which RETO should be started or stopped. Some such example implementations also provide a recommendation for a position and/or time at which one or more engines should be started or shut down to reduce delays associated with the safe operation of engines while improving the fuel savings associated with a permitted RETO.

For example, as shown in FIG. 2, an aircraft 100 can use RETO to proceed from its gate 208 to the runway 202 for departure. In accordance with example implementations of the subject disclosure, a taxi operation support system 302 can recommend that the aircraft start the engines and return to a normal taxi operation at point 214 to allow for enough time for all engines to be warmed up and otherwise ready for takeoff operations when the aircraft is cleared to depart via the runway 202. For an aircraft arriving via runway 204, the taxi operation support system can recommend that the aircraft use a normal taxi operation until reaching point 216, where one or more engines should be shut off to allow for RETO from point 216 to the relevant gate 208.

Figure 3:
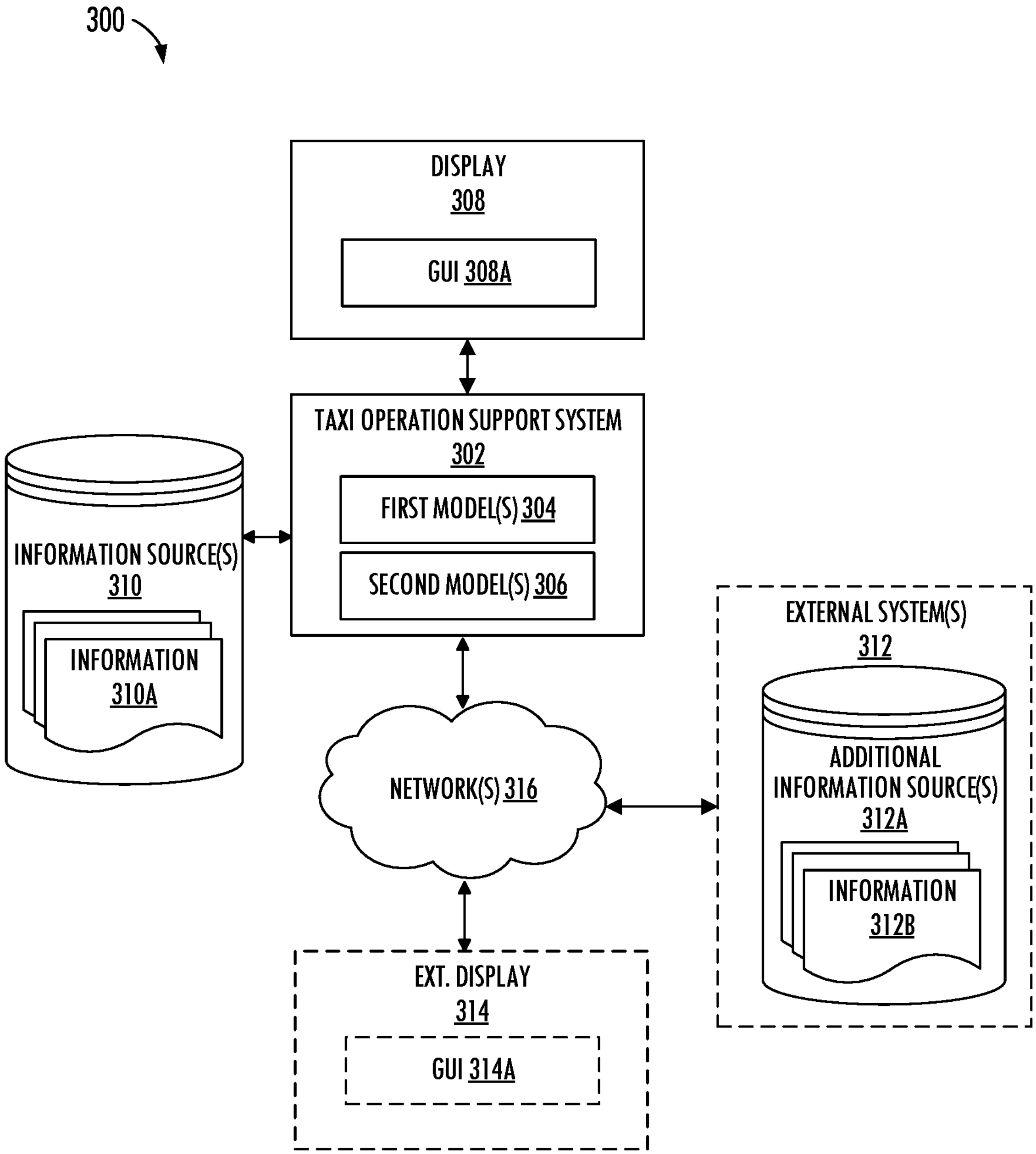
FIG. 3 is a block diagram of a system for supporting taxi operation of an aircraft at an airport, the aircraft with fuel-consuming systems including multiple engines, according to example implementations of the subject disclosure.

FIG. 3 is a block diagram of a system 300 for supporting taxi operation of an aircraft at an airport, such as aircraft 100 at airport 200, according to example implementations of the subject disclosure. The system 300 includes any of a number of different subsystems (each an individual system) for performing one or more functions or operations. As shown, in some examples, the system 300 includes one or more of each of a taxi operation support system 302 (which can include one or more first models 304 and one or more second models 306), a display device 308, and one or more information sources 310. In some example implementations, the system 300 can also include one or more external systems 312 with additional information sources 312A, and an external display device 314. The subsystems can be co-located or directly coupled to one another, or in some examples, various ones of the subsystems can communicate with one another across one or more computer networks 316.

Further, although shown as part of the system 300, it should be understood that any one or more of the taxi operation support system 302, first models 304, second models 306, display device 308, information sources 310, external systems 312, additional information sources 312A, or external display 314 can function or operate as a separate system without regard to any of the other subsystems. It should also be understood that the system can include one or more additional or alternative subsystems than those shown in FIG. 3.

In some example implementations, the taxi operation support system 302 can be located on and/or otherwise interact with the aircraft 100. In such example implementations, the taxi operation support system can be co-located or directly coupled to various ones of the subsystems, including but not limited to any of the high-level systems 110, the engines 112, and the APU 120, any of which can communicate with one another across one or more computer networks 126. In some example implementations, the taxi operation support system can be located remotely from a given aircraft, and use or more computer networks to interact with the airplane's high-level systems, engines, APU, and/or any other system that is configured to communicate directly or indirectly via a computer network.

Example implementations of the subject disclosure involve supporting taxi operation of an aircraft 100 at an airport 200, the aircraft with fuel-consuming systems including multiple engines 112. In some such example implementations, the taxi operation support system 302 receives information 310A, 312B from one or more information sources 310, and/or via a network 316 from one or more additional information source(s) 312A (e.g., an air traffic control system, airline data server, webserver, etc.).

Any information or combination of information that affects a decision on whether, when, and/or how RETO should be implemented in a given situation can be received by the taxi operation support system 302. In some example implementations, the received information 310A, 312B includes information that indicates a predicted taxi duration of a taxi operation of a flight of the aircraft 100. In some example implementations, the received information indicating a predicted taxi duration includes a queue duration in which the aircraft is standing. In some example implementations, the received information indicates weather conditions at the airport 200. In some example implementations, the received information includes standard operations procedures (SOP) of the airport. In some example implementations, the received information includes an engine-warmup duration. In some example implementations, the received information includes an aircraft weight. In some example implementations, the received information indicates a given airport layout, map, or other airport-related information, a given gate 208, and a given runway 202, 204. In some example implementations, the received information includes an indication of a given type of aircraft. In some example implementations, the received information includes a pushback time of the aircraft from a gate of the airport and an engine-warmup duration.

In some example implementations of the subject disclosure, the taxi operation support system 302 is configured to determine whether RETO of the aircraft 100 is permitted based on the predicted taxi duration and/or weather conditions. As shown in FIG. 3, the taxi operation support system 302 is configured to interact with one or more information source(s) 310 to acquire or otherwise receive information 310A used in determining whether, when, and how RETO should be used in a given situation. In some example implementations, the information received in connection with making a RETO decision can be received from one or more information source(s) that are integrated with and/or in communication with the taxi operation support system 302. In some example implementations, information 312B can be received by the taxi operation support system 302 via one or more computer networks 316 from one or more external systems 312 that include one or more additional information sources 312A.

In some example implementations where the received information 310A, 312B includes the SOP of the airport 200, the taxi operation support system 302 is configured to determine whether RETO of the aircraft 100 is permitted, which includes determining whether the airport permits RETO from the SOP.

In example implementations of the subject disclosure, the taxi operation support system 302 is configured to determine a fuel savings of RETO in which at least a portion of the taxi operation is performed with less than all of the multiple engines 112 of the aircraft 100 running, relative to a normal taxi operation in which the taxi operation is performed with all of the multiple engines 112 of the aircraft 100 running. In some such example implementations, the taxi operation support system 302 is configured to apply one or more portions of the received information 310A, 312B, to one or more first models 304 and one or more second models 306. Some example implementations involve the taxi operation support system 302 being configured to apply the received information 310A, 312B to one or more models (e.g., models 304 and/or 306) trained and configured to predict and produce predictions of fuel burn for respective ones of the fuel-consuming systems (such as the engines 112 and APU 120) of the aircraft 100, for example.

For example, in some example implementations, the taxi operation support system 302 is configured to determine the fuel savings by at least applying the received predicted taxi duration, the queue duration, and the aircraft weight to first models 304 that have been trained to predict and thereby produce first predictions of fuel burn for respective ones of the fuel-consuming systems for normal taxi operation. Further, in some example implementations, the taxi operation support system 302 is configured to applying the predicted taxi duration, the queue duration, the engine-warmup duration, and the aircraft weight to second models 306 trained to predict and thereby produce second predictions of fuel burn for respective ones of the fuel-consuming systems for RETO.

In some example implementations involving the use of models 304 and/or 306 to predict fuel burn for normal taxi operations and RETO, the taxi operation support system 302 is configured to calculate a first prediction of total fuel burn for normal taxi operation from the predictions from the first model(s) 304 and a second prediction of total fuel burn for RETO from the predictions from the second model(s) 306. The taxi operation support system 302 is also configured to then determine a difference between the first prediction of total fuel burn and the second prediction of total fuel burn that indicates the fuel savings of RETO relative to normal taxi operation.

Some example implementations of the subject disclosure involve an aircraft 100 with fuel-consuming systems that include an APU 120. In some such example implementations, the first models 304 are trained to predict and thereby produce the first predictions of fuel bur for respective ones of the multiple engines 112 and the APU 120 for normal taxi operation, and the second models 306 are trained to predict and thereby produce the second predictions of fuel burn for respective ones of the multiple engines 112 and the APU 120 for RETO.

Some example implementations of the subject disclosure arise in situations where the taxi operation is a taxi-out operation that includes taxiing of the aircraft 100 from a given gate 208 to a given runway 202 of the airport 200. In some such example implementations, the first models 304 and the second models 306 are specific to the given airport, the given gate 208, and the given runway 202, and the first models 304 are trained to predict and thereby produce the first predictions of fuel burn for respective ones of the fuel consuming systems 112 (in the case of the engines), 120 (in the case of the APU) for normal taxi operation from the given gate to the given runway, and the second models 306 are trained to predict and thereby produce the second predictions of fuel burn for respective ones of the fuel-consuming systems for RETO from the given gate 208 to the given runway 202.

In some example implementations involving a taxi-out operation, the received information 310A, 312B includes an indication of a pushback time of the aircraft 100 from a gate 208 of the airport 200 and an engine-warmup duration. In some such example implementations, the taxi operation support system 302 is also configured to determine start times for the respective ones of the multiple engines 112 from the pushback time, the predicted taxi time, and the engine-warmup duration when the recommendation is RETO. In example implementations, where a recommendation is output to a display 308, 314, outputting the recommendation includes the taxi operation support system 302 being configured to output the recommendation in the relevant GUI 308A, 314A that also indicates start times for respective ones of the multiple engines 112.

Some example implementations involve aircraft-specific determinations of whether, when, and/or how RETO should be performed. In some such example implementations, the aircraft 100 is a given type of aircraft, and the first models 304 and the second models 306 are specific to the given type of aircraft. In such example implementations, the first models 304 are trained to predict and thereby produce the first predictions of fuel burn for respective ones of the fuel-consuming systems 112, 120 for normal taxi operation of the given type of aircraft, and the second models 306 are trained to predict and thereby produce the second predictions of fuel burn for respective ones of the fuel-consuming systems for RETO of the given type of aircraft.

Example implementations of the subject disclosure also involve the taxi operation support system 302 outputting a recommendation of RETO or normal operation to a display device 308, 314 onboard the aircraft 100. In example implementations where the taxi operation support system 302 is located on the aircraft 100, the taxi operation support system 302 is configured to output the recommendation to display device 308, which can also incorporate a graphical user interface (GUI) 308A, the display and its GUI also located on the aircraft. In example implementations where the taxi operation support system 302 is located remotely from the aircraft, the taxi operation support system can be configured to output the recommendation and communicate with an external display 314 and/or its GUI 314A, wherein the display 314 and its GUI 314A are external to the taxi operation support system and located on the aircraft 100.

In some example implementations of the subject disclosure, after determining whether RETO is permitted and the fuel savings associated with RETO, the taxi operation support system 302 is configured to output a recommendation of RETO or normal taxi operation to a display device 308, 314 onboard the aircraft 100, the recommendation being of RETO when the fuel savings is at least a given minimum fuel savings. In some such example implementations, the taxi operation support system 302 is configured to output the recommendation in a graphical user interface (GUI) 308A, 314A that also indicates the second predictions of fuel burn for respective ones of the fuel-consuming systems 112, 120 when the recommendation is RETO, and that indicates the first predictions of fuel burn for respective ones of the fuel-consuming systems when the recommendation is normal taxi operation. In some example implementations, the recommendations can be provided to one or more control systems configured to use recommendations to modify the operation of the aircraft, including but not limited to unmanned air vehicles (UAVs).

Figure 4A:
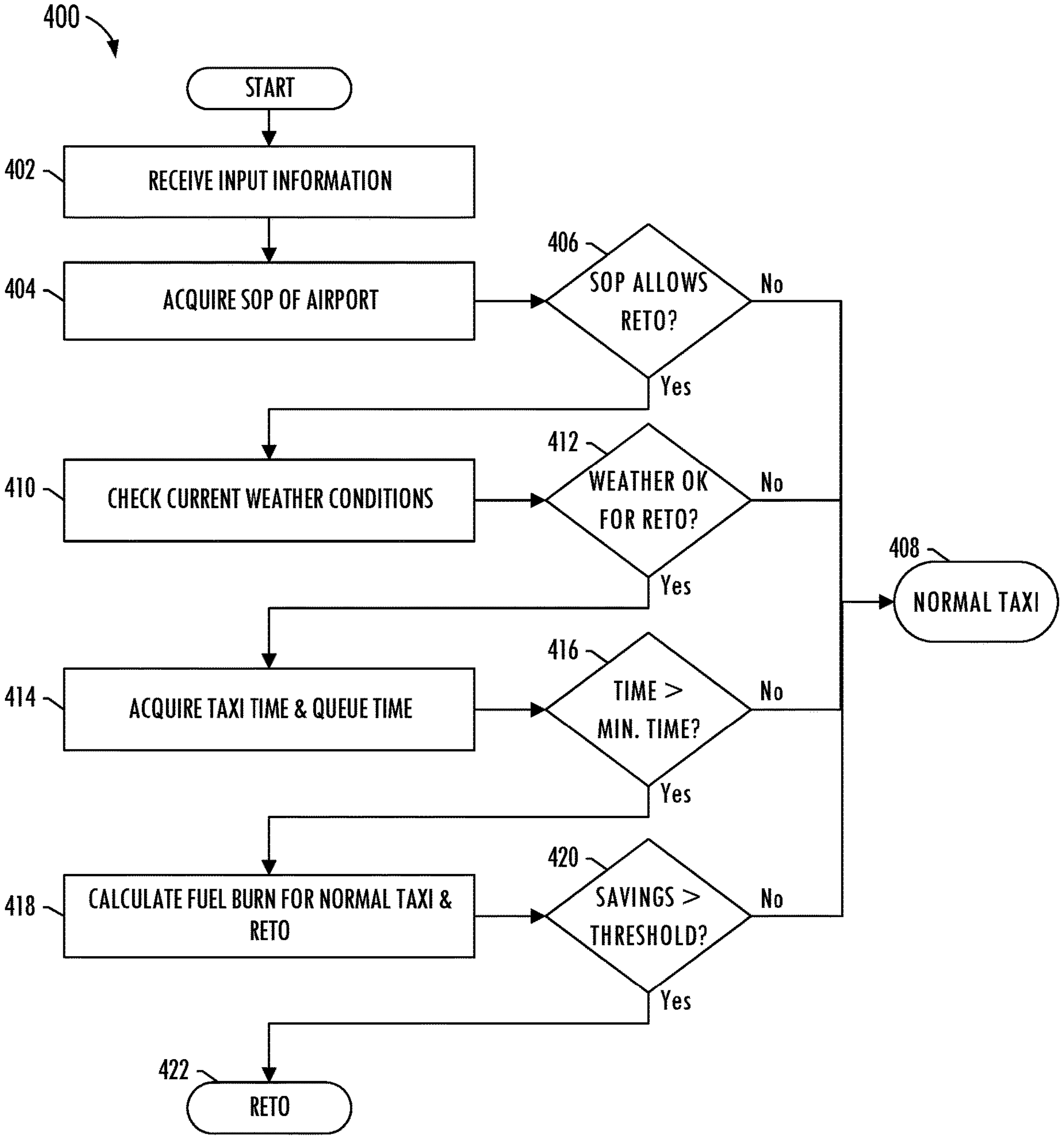
FIG. 4A is a decision flow illustrating aspects of a system for supporting taxi operation of an aircraft at an airport, according to example implementations of the subject disclosure.

FIG. 4A is a decision flow 400 illustrating aspects of a system 300 for supporting taxi operation of an aircraft at an airport, such as aircraft 100 at airport 200, according to example implementations of the subject disclosure. In some example implementations, the taxi operation support system 302 is configured to automatically implement the steps and decisions reflected in the decision flow 400 when determining whether, when, and how RETO should be performed. It will be appreciated that the decision flow 400 is presented to illustrate example operations performed by one or more example implementations of the subject disclosure, and the operations shown in FIG. 4A and discussed herein can be performed in a different order and/or omitted in various example implementations.

As shown in FIG. 4A, the decision flow 400 starts and transitions to block 402, which includes receiving input information. Any of the received information discussed or otherwise disclosed herein, including but not limited to the information 310A and 312B, can be used in example implementations of block 402. Upon receipt of the relevant information, the decision flow transitions to block 404, which includes acquiring the standard operating procedures of the relevant airport 200. As shown in block 406, the decision flow uses the SOP of the airport to determine if RETO is permitted at the airport. In situations where the SOP do not permit RETO, the decision flow transitions to block 408, and recommends using normal taxi operations.

In situations where the SOP of the airport 200 permits RETO, the decision flow 400 transitions to block 410, which involves checking the current weather conditions, which may have been received as input information at block 402 or otherwise received. As shown at block 412, the weather conditions are used to determine whether the weather conditions permit RETO. In situations where the weather conditions do not permit RETO (such as certain high wind conditions, limited visibility conditions, rain conditions, ice or snow conditions, or the like, for example), the decision flow transitions to block 408, and recommends using normal taxi operations.

In situations where the weather conditions permit RETO, the decision flow 400 transitions to block 414, which involves acquiring the relevant taxi time and queue time. In some example implementations, the taxi time and queue time are received as input information at block 402, or can be otherwise acquired. In situations where the taxi time or queue time are not above a minimum time duration for RETO (e.g., a predetermined minimum time duration), the decision flow transitions to block 408, and recommends using normal taxi operations.

In situations where there is sufficient taxi and queue time for RETO, the decision flow 400 transitions to block 418, which involves calculating the fuel burn for normal taxi operations and RETO. Any of the approaches to calculating a fuel burn discussed or otherwise disclosed herein, including but not limited to the use by the taxi operations support system 302 of the first models 304 and the second models 306. As shown at block 420, the decision flow uses the calculated fuel burns to determine whether the fuel savings associated with RETO exceed a defined criterion (e.g., predetermined threshold). In situations where the predicted fuel savings fall below the threshold, the decision flow transitions to block 408, and recommends normal taxi operations. However, if the predicted fuel savings are above the threshold, the decision flow transitions to block 422, and recommends proceeding with RETO.

Figure 4B:
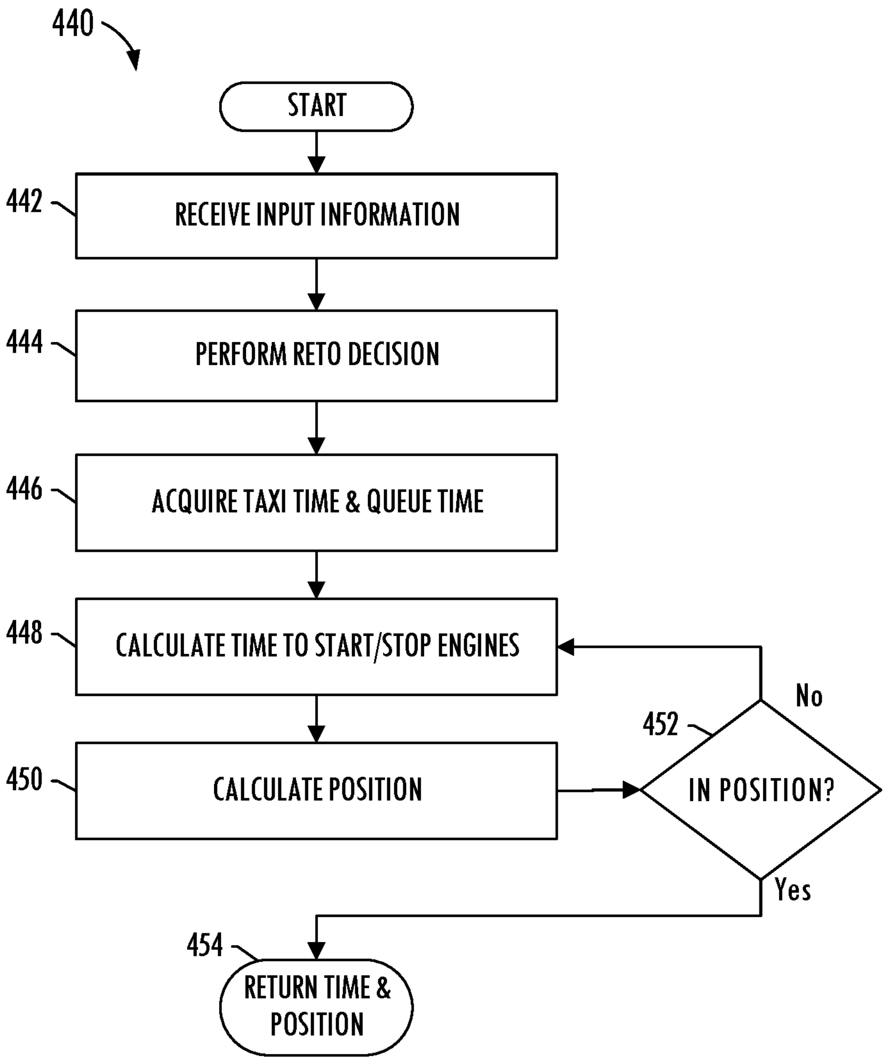
FIG. 4B is another decision flow illustrating aspects of a system for supporting taxi operation of an aircraft at an airport, according to example implementations of the subject disclosure.

FIG. 4B is another decision flow 440 illustrating aspects of a system for supporting taxi operation of an aircraft at an airport, according to example implementations of the subject disclosure. In some example implementations, the taxi operation support system 302 automatically implements the steps and decisions reflected in the decision flow 440 when determining whether, when, and how RETO should be performed in a given situation. It will be appreciated that the decision flow 440 is presented to illustrate example operations performed by one or more example implementations of the subject disclosure, and the operations shown in FIG. 4B and discussed herein can be performed in a different order and/or omitted in various example implementations.

In some example situations, the proper operation of the aircraft 100 and the engines 112 thereof involve the observation of recommendations governing the duration needed for the engines 112 to properly warm up before being used for takeoff and flight and the duration of time needed for the engines to be properly cooled down after being engaged in flight and landing. These durations can impose additional technical challenges to the effective performance of RETO, since RETO involves the use of less than all of the multiple engines 112 of the aircraft 100. In particular, starting the warm up of engines not used in RETO too late can result in delays and additional fuel burn on or near a runway, which can reduce the fuel savings associated with RETO and cause operational issues at the airport. However, starting the warm up of engines not used in RETO too early results in a reduced RETO duration, and thus limits the fuel savings associated with an optimized RETO performance. The decision flow 440 in FIG. 4B depicts an example decision flow that can be used by the taxi operation support system 302 to develop and include an indication of the position and time at which warmup procedure for the engines not used in a given RETO should be started.

As shown in FIG. 4B, the decision flow 440 starts and transitions to block 442, which includes receiving input information. Any of the received information discussed or otherwise disclosed herein, including but not limited to the information 310A and 312B, can be used in implementations of block 442. For example, the information received at block 442 can include information pertaining to the aircraft 100, the engines 112, and the airport 200, or the like.

Upon receipt of the information at block 442, the decision flow 440 transitions to block 444, which involves performing a RETO decision. Any of the approaches to determining whether to recommend RETO discussed or otherwise disclosed herein can be used in connection with example implementations of block 444, including but not limited to those discussed in connection with FIGS. 3, 4A, and 5 herein. In situations where RETO is recommended, the decision flow transitions to block 446, which involves acquiring the taxi time and queue time associated with the relevant taxi operation. The information acquired in block 446 is used in block 448 to calculate the time to start and/or stop the relevant engines 112, and in block 450 to calculate the position at which the engines should be started or stopped.

As shown in block 452, after the relevant time is calculated at block 448 and the relevant position is calculated at block 450, it can be determined (e.g., by the taxi operation support system 302) whether the aircraft 100 is in the calculated position. If the aircraft 100 is determined to be in or near the position, the decision flow transitions to block 454, and returns a recommendation of the time and position at which the relevant engines 112 should be started or stopped, and can cause an indication to be outputted to a display 308, 314, onboard the aircraft. In an example, the presentation of the indication via display 308, 314 can prompt a pilot of the aircraft to initiate and/or preform RETO operations. If the aircraft is not in or near the position, the decision flow 440 transitions back to block 448 to recalculate the time to start and/or stop the engines based at least in part on the current position of the aircraft.

Figure 5:
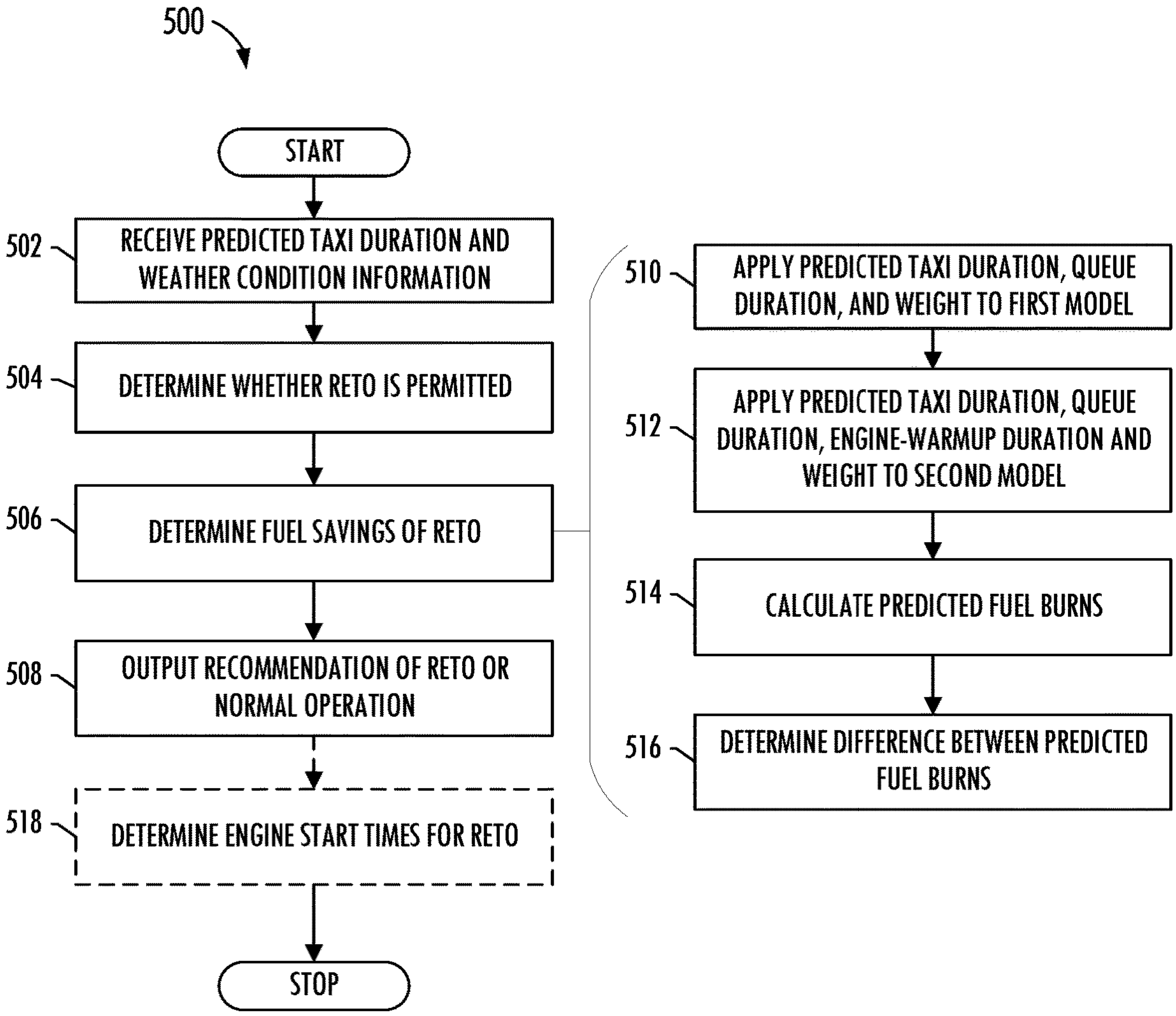
FIG. 5 is a flowchart illustrating various steps in a method of supporting taxi operation of an aircraft at an airport, the aircraft with fuel-consuming systems including multiple engines, according to example implementations.

FIG. 5 is a flowchart illustrating various steps in a method 500 of supporting taxi operations of an aircraft at an airport, the aircraft with fuel-consuming systems including multiple engines, according to example implementations of the subject disclosure. In some examples, the taxi operation support system 302 can implement at least a portion of the method 500. As shown at block 502, the method includes receiving predicted taxi duration and weather condition information. Some example implementations of block 502 involve receiving information that indicates a predicted taxi duration of a taxi operation of a flight of the aircraft, and information that indicates weather conditions at the airport. In some example implementations, the information also includes standard operating procedures (SOP) of the airport. For example, an airports SOP may not permit RETO in one or more situations, and the SOP of the airport may hold operational precedence over the taxi operations and/or other operations of the aircraft. In some example implementations, the information indicates the predicted taxi duration including a queue duration in which the aircraft is standing, and the information further indicates an engine-warmup duration, and/or an aircraft weight.

Some example implementations of block 502 arise in situations where the taxi operation is a taxi-out operation that includes taxi of the aircraft from a given gate to a given runaway of the airport. In some such example implementations, the information further indicates the airport, the given gate, and the given runway. In some example implementations involving a taxi-out operation, the received information further indicates a pushback time of the aircraft from a gate of the airport, and/or an engine-warmup time.

As shown at block 504, the method 500 includes determining whether a RETO is permitted. Some example implementations of block 504 involve determining whether a reduced-engine taxi operation of the aircraft is permitted based on the predicted taxi duration and the weather conditions. In some example implementations where the received information includes the SOP of the airport, determining whether RETO of the aircraft is permitted includes determining whether the airport permits RETO from the SOP.

In situations where a reduced-engine taxi operation of the aircraft is permitted, the method 500 includes determining the fuel savings of RETO, as shown in block 506. Some example implementations of block 506 involve determining a fuel savings of RETO in which at least a portion of the taxi operation is performed with less than all of the multiple engines of the aircraft running, relative to a normal taxi operation in which the taxi operation is performed with all of the multiple engines of the aircraft running.

As shown in FIG. 3, some example implementations of block 506 involve additional operations that can leverage various aspects of the received information to determine the fuel savings associated with a relevant RETO. As shown at block 510, determining the fuel savings in some example implementations includes applying the predicted taxi duration, queue duration, and weight to a first model. Some example implementations of block 510 arise in instances where the received information indicates the predicted taxi duration including a queue duration in which the aircraft is standing, and the information further indicates an engine-warmup duration, and an aircraft weight, and such example implementations involve applying the predicted taxi duration, the queue duration, and the aircraft weight to first models trained to predict and thereby produce first predictions of fuel burn for respective ones of the fuel-consuming systems for normal taxi operations.

Some example implementations of block 510 arise in situations where the fuel-consuming systems of the aircraft also include an APU. In some such example implementations, the first models are trained to predict and thereby produce the first predictions of fuel burn for respective ones of the multiple engines and the APU for normal operations As shown at block 512, some example implementations of block 506 that arise in situations where the received information indicates the predicted taxi duration including a queue duration in which the aircraft is standing, and the information further indicates an engine-warmup duration, and an aircraft weight, include applying the predicted taxi duration, queue duration, engine-warmup duration, and weight to a second model. Some example implementations of block 512 involve applying the predicted taxi duration, the queue duration, the engine-warmup duration, and the aircraft weight to second models trained to predict and thereby produce second predictions of fuel burn for respective ones of the fuel-consuming systems for RETO.

Some example implementations of block 512 arise in situations where the fuel-consuming systems of the aircraft also include an APU. In some such example implementations, the second models are trained to predict and thereby produce the first predictions of fuel burn for respective ones of the multiple engines and the APU for RETO.

Some example implementations of block 510 and block 512 arise in situations where the taxi operation is a taxi-out operation that includes taxi of the aircraft from a given gate to a given runaway of the airport, and the received information further indicates the airport, the given gate, and the given runway. In some such example implementations the first models and the second models are specific to the airport, the given gate, and the given runway, the first models trained to predict and thereby produce the first predictions of fuel burn for the respective ones of the fuel-consuming systems for normal taxi operation from the given gate to the given runway, and the second models trained to predict and thereby produce the second prediction of fuel burn for respective ones of the fuel-consuming systems for RETO from the given gate to the given runway.

Some example implementations of block 510 and block 512 arise in situations where the aircraft is a given type of aircraft. In some such example implementations the first models and the second models are specific to the given type of aircraft, the first models trained to predict and thereby produce the first predictions of fuel burn for respective ones of the fuel-consuming systems for normal taxi operation of the given type of aircraft, and the second models trained to predict and thereby produce the second predictions of fuel burn for respective ones of the fuel-consuming systems for RETO of the given type of aircraft.

As shown at block 514, some example implementations of block 506 that arise in situations where the received information indicates the predicted taxi duration including a queue duration in which the aircraft is standing, and the information further indicates an engine-warmup duration, and an aircraft weight, include calculating predicted fuel burns. Some example implementations of block 514 involve calculating a first prediction of total fuel burn for normal taxi operation from the first predictions, and a second prediction of total fuel burn for RETO from the second predictions.

As shown at block 516, some example implementations of block 506 that arise in situations where the received information indicates the predicted taxi duration including a queue duration in which the aircraft is standing, and the information further indicates an engine-warmup duration, and an aircraft weight, include determining a difference between the predicted fuel burns. Some example implementations of block 514 involve determining a difference between the first prediction of total fuel burn and the second prediction of total fuel burn that indicates the fuel saving of RETO relative to normal taxi operation.

As shown at block 508, the method 500 also includes outputting a recommendation of RETO or normal operation. Some example implementations of block 508 involve outputting a recommendation of RETO or normal taxi operation to a display device onboard the aircraft, the recommendation of RETO when the fuel savings is at least a given minimum fuel savings. In some example implementations of block 508, outputting the recommendation includes outputting the recommendation in a graphical user interface (GUI) that also indicates the second predictions of fuel burn for respective ones of the fuel-consuming systems when the recommendation is RETO, and that indicates the first predictions of fuel burn for respective ones of the fuel-consuming systems when the recommendation is normal taxi operation. It will be appreciated that the first predictions of fuel burn and/or the second predictions of fuel burn can be developed in connection with example implementations of blocks 506, 510, 512, 514, and/or 516.

Some example implementations of block 508 arise in situations where the taxi operation is a taxi-out operation, and the received information further indicates a pushback time of the aircraft from a gate of the airport, and an engine-warmup time. Some such example implementations involve using the pushback time, predicted taxi time, and engine-warmup duration to determine the start times for respective ones of the multiple engines of the aircraft. In some such example implementations, outputting the recommendation includes outputting the recommendation in a graphical user interface (GUI) that also indicates the start times for respective ones of the multiple engines.

As shown in FIG. 5, the method 500 can also include block 518. Some example implementations of the method 500 arise in situations where the taxi operation is a taxi-out operation. In some such example implementations, the received information can further indicate a pushback time of the aircraft from a gate of the airport and an engine-warmup duration. As shown in block 518, some such example implementations of the method include determining engine start times for RETO. Some example implementations of block 518 involve determining start times for respective ones of the multiple engines form the pushback time, and further from the predicted taxi time and the engine-warmup duration when the recommendation is RETO. As discussed or otherwise disclosed herein, such as in connection with block 508, indications of the start times for respective ones of the multiple engines can be presented on the GUI that includes the recommendation of RETO. In some examples, the displayed information can be utilized (e.g., by a pilot or other control system) to perform RETO.

According to example implementations of the subject disclosure, the system 300 and its subsystems including the taxi operation support system 302, first models 304, second models 306, display device 308, information sources 310, external systems 312, additional information sources 312A, or external display 314 can be implemented by various means. Means for implementing the system and its subsystems can include hardware, alone or under direction of one or more computer programs from a computer-readable storage medium. In some examples, one or more apparatuses can be configured to function as or otherwise implement the system and its subsystems shown and described herein. In examples involving more than one apparatus, the respective apparatuses can be connected to or otherwise in communication with one another in a number of different manners, such as directly or indirectly via a wired or wireless network or the like.

Figure 6:
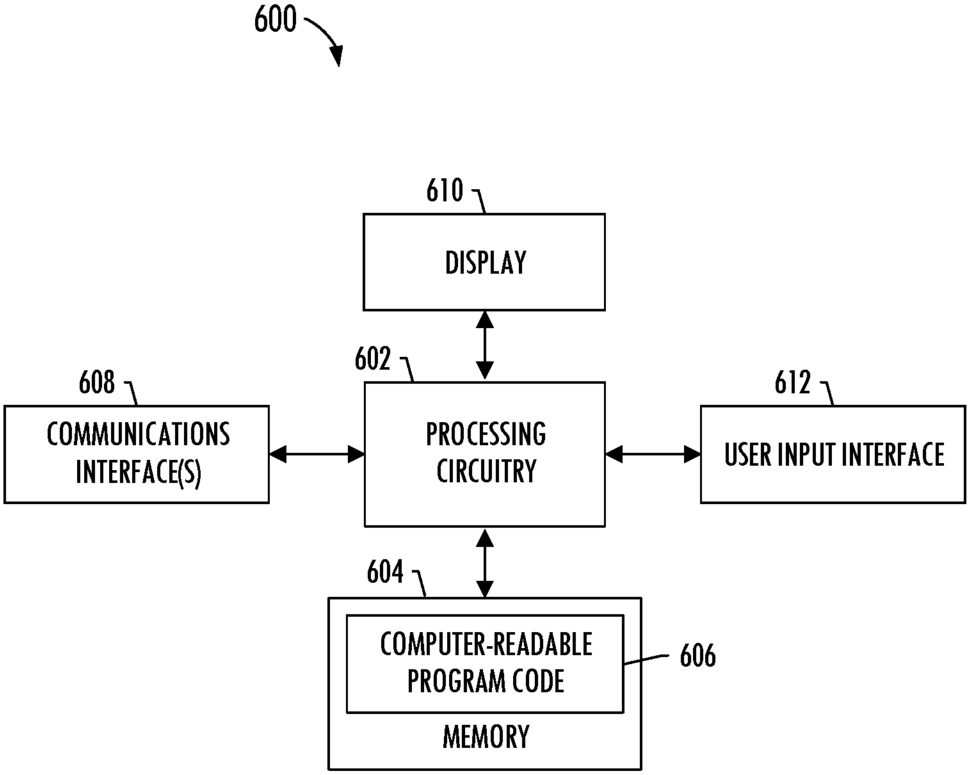
FIG. 6 illustrates an apparatus according to some example implementations of the subject disclosure.

FIG. 6 illustrates an apparatus 600 according to some example implementations of the subject disclosure. Generally, an apparatus of exemplary implementations of the subject disclosure can comprise, include or be embodied in one or more fixed or portable electronic devices. Examples of suitable electronic devices include a smartphone, tablet computer, laptop computer, desktop computer, workstation computer, server computer or the like. The apparatus can include one or more of each of a number of components such as, for example, processing circuitry 602 (e.g., processor unit) connected to a memory 604 (e.g., storage device).

The processing circuitry 602 can be composed of one or more processors alone or in combination with one or more memories. The processing circuitry is generally any piece of computer hardware that is capable of processing information such as, for example, data, computer programs and/or other suitable electronic information. The processing circuitry is composed of a collection of electronic circuits some of which can be packaged as an integrated circuit or multiple interconnected integrated circuits (an integrated circuit at times more commonly referred to as a “chip”). The processing circuitry can be configured to execute computer programs, which can be stored onboard the processing circuitry or otherwise stored in the memory 604 (of the same or another apparatus).

The processing circuitry 602 can be a number of processors, a multi-core processor or some other type of processor, depending on the particular implementation. Further, the processing circuitry can be implemented using a number of heterogeneous processor systems in which a main processor is present with one or more secondary processors on a single chip. As another illustrative example, the processing circuitry can be a symmetric multi-processor system containing multiple processors of the same type. In yet another example, the processing circuitry can be embodied as or otherwise include one or more ASICs, FPGAs or the like. Thus, although the processing circuitry can be capable of executing a computer program to perform one or more functions, the processing circuitry of various examples can be capable of performing one or more functions without the aid of a computer program. In either instance, the processing circuitry can be appropriately programmed to perform functions or operations according to example implementations of the subject disclosure.

The memory 604 is generally any piece of computer hardware that is capable of storing information such as, for example, data, computer programs (e.g., computer-readable program code 606) and/or other suitable information either on a temporary basis and/or a permanent basis. The memory can include volatile and/or non-volatile memory, and can be fixed or removable. Examples of suitable memory include random access memory (RAM), read-only memory (ROM), a hard drive, a flash memory, a thumb drive, a removable computer diskette, an optical disk, a magnetic tape or some combination of the above. Optical disks can include compact disk-read only memory (CD-ROM), compact disk-read/write (CD-R/W), DVD or the like. In various instances, the memory can be referred to as a computer-readable storage medium. The computer-readable storage medium is a non-transitory device capable of storing information, and is distinguishable from computer-readable transmission media such as electronic transitory signals capable of carrying information from one location to another. Computer-readable medium as described herein can generally refer to a computer-readable storage medium or computer-readable transmission medium.

In addition to the memory 604, the processing circuitry 602 can also be connected to one or more interfaces for displaying, transmitting and/or receiving information. The interfaces can include a communications interface 608 (e.g., communications unit) and/or one or more user interfaces. The communications interface can be configured to transmit and/or receive information, such as to and/or from other apparatus(es), network(s) or the like. The communications interface can be configured to transmit and/or receive information by physical (wired) and/or wireless communications links. Examples of suitable communication interfaces include a network interface controller (NIC), wireless NIC (WNIC) or the like.

The user interfaces can include a display 610 and/or one or more user input interfaces 612 (e.g., input/output unit). The display can be configured to present or otherwise display information to a user, suitable examples of which include a liquid crystal display (LCD), light-emitting diode display (LED), plasma display panel (PDP) or the like. The user input interfaces can be wired or wireless, and can be configured to receive information from a user into the apparatus, such as for processing, storage and/or display. Suitable examples of user input interfaces include a microphone, image or video capture device, keyboard or keypad, joystick, touch-sensitive surface (separate from or integrated into a touchscreen), biometric sensor or the like. The user interfaces can further include one or more interfaces for communicating with peripherals such as printers, scanners or the like.

As indicated above, program code instructions can be stored in memory, and executed by processing circuitry that is thereby programmed, to implement functions of the systems, subsystems, tools and their respective elements described herein. As will be appreciated, any suitable program code instructions can be loaded onto a computer or other programmable apparatus from a computer-readable storage medium to produce a particular machine, such that the particular machine becomes a means for implementing the functions specified herein. These program code instructions can also be stored in a computer-readable storage medium that can direct a computer, a processing circuitry or other programmable apparatus to function in a particular manner to thereby generate a particular machine or particular article of manufacture. The instructions stored in the computer-readable storage medium can produce an article of manufacture, where the article of manufacture becomes a means for implementing functions described herein. The program code instructions can be retrieved from a computer-readable storage medium and loaded into a computer, processing circuitry or other programmable apparatus to configure the computer, processing circuitry or other programmable apparatus to execute operations to be performed on or by the computer, processing circuitry or other programmable apparatus.

Retrieval, loading and execution of the program code instructions can be performed sequentially such that one instruction is retrieved, loaded and executed at a time. In some example implementations, retrieval, loading and/or execution can be performed in parallel such that multiple instructions are retrieved, loaded, and/or executed together. Execution of the program code instructions can produce a computer-implemented process such that the instructions executed by the computer, processing circuitry or other programmable apparatus provide operations for implementing functions described herein.

Execution of instructions by a processing circuitry, or storage of instructions in a computer-readable storage medium, supports combinations of operations for performing the specified functions. In this manner, an apparatus 600 can include a processing circuitry 602 and a computer-readable storage medium or memory 604 coupled to the processing circuitry, where the processing circuitry is configured to execute computer-readable program code 606 stored in the memory. It will also be understood that one or more functions, and combinations of functions, can be implemented by special purpose hardware-based computer systems and/or processing circuitry which perform the specified functions, or combinations of special purpose hardware and program code instructions.

Clause 1: A method that supports taxi operation of an aircraft at an airport, the aircraft with fuel-consuming systems comprising multiple engines, the method comprising: receiving, by a system comprising a processor, information that indicates a predicted taxi duration of a taxi operation of a flight of the aircraft, and that indicates weather conditions at the airport; determining whether a reduced-engine taxi operation (RETO) of the aircraft is permitted based on the predicted taxi duration and the weather conditions; and when RETO of the aircraft is permitted, determining a fuel savings of RETO in which at least a portion of the taxi operation is performed with less than all of the multiple engines of the aircraft running, relative to a normal taxi operation in which the taxi operation is performed with all of the multiple engines of the aircraft running; and outputting a recommendation of RETO or normal taxi operation to a display device onboard the aircraft, the recommendation of RETO when the fuel savings is at least a given minimum fuel savings.

Clause 2: The method of Clause 1, wherein the information comprises standard operations procedures (SOP) of the airport, and the determining whether RETO of the aircraft is permitted comprises determining whether the airport permits RETO from the SOP.

Clause 3: The method of any of Clauses 1-2, wherein the information indicates the predicted taxi duration comprising a queue duration in which the aircraft is standing, and the information further indicates an engine-warmup duration, and an aircraft weight, and wherein determining the fuel savings comprises: applying the predicted taxi duration, the queue duration and the aircraft weight to first models trained to predict and thereby produce first predictions of fuel burn for respective ones of the fuel-consuming systems for the normal taxi operation; applying the predicted taxi duration, the queue duration, the engine-warmup duration and the aircraft weight to second models trained to predict and thereby produce second predictions of fuel burn for respective ones of the fuel-consuming systems for RETO; calculating a first prediction of a total fuel burn for the normal taxi operation from the first predictions, and a second prediction of the total fuel burn for RETO from the second predictions; and determining a difference between the first prediction of the total fuel burn and the second prediction of total fuel burn that indicates the fuel savings of RETO relative to normal taxi operation.

Clause 4: The method of any of Clauses 1-3, wherein the fuel-consuming systems of the aircraft also comprise an auxiliary power unit (APU), the first models are trained to predict and thereby produce the first predictions of fuel burn for respective ones of the multiple engines and the APU for the normal taxi operation, and the second models are trained to predict and thereby produce the second predictions of fuel burn for respective ones of the multiple engines and the APU for RETO.

Clause 5: The method of any of Clauses 1-4, wherein the taxi operation is a taxi-out operation that comprises taxi of the aircraft from a given gate to a given runway of the airport, and the information further indicates the airport, the given gate, and the given runway, and wherein the first models and the second models are specific to the airport, the given gate and the given runway, the first models trained to predict and thereby produce the first predictions of fuel burn for respective ones of the fuel-consuming systems for the normal taxi operation from the given gate to the given runway, and the second models trained to predict and thereby produce the second predictions of fuel burn for respective ones of the fuel-consuming systems for RETO from the given gate to the given runway.

Clause 6: The method of any of Clauses 1-5, wherein the aircraft is of a given type of aircraft, and wherein the first models and the second models are specific to the given type of aircraft, the first models trained to predict and thereby produce the first predictions of fuel burn for respective ones of the fuel-consuming systems for the normal taxi operation of the given type of aircraft, and the second models trained to predict and thereby produce the second predictions of fuel burn for respective ones of the fuel-consuming systems for RETO of the given type of aircraft.

Clause 7: The method of any of Clauses 1-6, wherein outputting the recommendation comprises outputting the recommendation via a graphical user interface (GUI) that also indicates the second predictions of fuel burn for respective ones of the fuel-consuming systems when the recommendation is RETO, and that indicates the first predictions of fuel burn for respective ones of the fuel-consuming systems when the recommendation is the normal taxi operation.

Clause 8: The method of any of Clauses 1-7, wherein the taxi operation is a taxi-out operation, and the information further indicates a pushback time of the aircraft from a gate of the airport, and an engine-warmup duration, wherein the method further comprises determining start times for respective ones of the multiple engines from the pushback time, and further from a predicted taxi time and the engine-warmup duration when the recommendation is RETO, and wherein outputting the recommendation comprises outputting the recommendation via a graphical user interface (GUI) that also indicates the start times for respective ones of the multiple engines.

Clause 9: An apparatus for supporting taxi operation of an aircraft at an airport, the aircraft with fuel-consuming systems comprising multiple engines, the apparatus comprising: a memory configured to store computer-readable program code; and processing circuitry configured to access the memory, and execute the computer-readable program code to cause the apparatus to at least: receive information that indicates a predicted taxi duration of a taxi operation of a flight of the aircraft, and that indicates weather conditions at the airport; determine whether a reduced-engine taxi operation (RETO) of the aircraft is permitted based on the predicted taxi duration and the weather conditions; and when RETO of the aircraft is permitted, determine a fuel savings of RETO in which at least a portion of the taxi operation is performed with less than all of the multiple engines of the aircraft running, relative to a normal taxi operation in which the taxi operation is performed with all of the multiple engines of the aircraft running; and output a recommendation of RETO or normal taxi operation to a display device onboard the aircraft, the recommendation of RETO when the fuel savings is at least a given minimum fuel savings.

Clause 10: The apparatus of Clause 9, wherein the information comprises standard operations procedures (SOP) of the airport, and determining whether RETO of the aircraft is permitted comprises determining whether the airport permits RETO from the SOP.

Clause 11: The apparatus of any of Clauses 9-10, wherein the information indicates the predicted taxi duration comprising a queue duration in which the aircraft is standing, and the information further indicates an engine-warmup duration, and an aircraft weight, and wherein determining the fuel savings comprises: applying the predicted taxi duration, the queue duration and the aircraft weight to first models trained to predict and thereby produce first predictions of fuel burn for respective ones of the fuel-consuming systems for the normal taxi operation; applying the predicted taxi duration, the queue duration, the engine-warmup duration and the aircraft weight to second models trained to predict and thereby produce second predictions of fuel burn for respective ones of the fuel-consuming systems for RETO; calculating a first prediction of total fuel burn for the normal taxi operation from the first predictions, and a second prediction of total fuel burn for RETO from the second predictions; and determining a difference between the first prediction of total fuel burn and the second prediction of total fuel burn that indicates the fuel savings of RETO relative to normal taxi operation.

Clause 12: The apparatus of any of Clauses 9-11, wherein the fuel-consuming systems of the aircraft also comprise an auxiliary power unit (APU), the first models are trained to predict and thereby produce the first predictions of fuel burn for respective ones of the multiple engines and the APU for the normal taxi operation, and the second models are trained to predict and thereby produce the second predictions of fuel burn for respective ones of the multiple engines and the APU for RETO.

Clause 13: The apparatus of any of Clauses 9-12, wherein the taxi operation is a taxi-out operation that comprises taxi of the aircraft from a given gate to a given runway of the airport, and the information further indicates the airport, the given gate, and the given runway, and wherein the first models and the second models are specific to the airport, the given gate and the given runway, the first models trained to predict and thereby produce the first predictions of fuel burn for respective ones of the fuel-consuming systems for the normal taxi operation from the given gate to the given runway, and the second models trained to predict and thereby produce the second predictions of fuel burn for respective ones of the fuel-consuming systems for RETO from the given gate to the given runway.

Clause 14: The apparatus of any of Clauses 9-13, wherein the aircraft is of a given type of aircraft, and wherein the first models and the second models are specific to the given type of aircraft, the first models trained to predict and thereby produce the first predictions of fuel burn for respective ones of the fuel-consuming systems for the normal taxi operation of the given type of aircraft, and the second models trained to predict and thereby produce the second predictions of fuel burn for respective ones of the fuel-consuming systems for RETO of the given type of aircraft.

Clause 15: The apparatus of any of Clauses 9-14, wherein outputting the recommendation comprises facilitating a presentation of the recommendation via a graphical user interface (GUI) that also indicates the second predictions of fuel burn for respective ones of the fuel-consuming systems when the recommendation is RETO, and that indicates the first predictions of fuel burn for respective ones of the fuel-consuming systems when the recommendation is the normal taxi operation.

Clause 16: The apparatus of any of Clauses 9-15, wherein the taxi operation is a taxi-out operation, and the information further indicates a pushback time of the aircraft from a gate of the airport, and an engine-warmup duration, wherein the processing circuitry is configured to execute the computer-readable program code to cause the apparatus to further at least determine start times for respective ones of the multiple engines from the pushback time, and further from the predicted taxi time and the engine-warmup duration when the recommendation is RETO, and wherein outputting the recommendation comprises facilitating a presentation of the recommendation via a graphical user interface (GUI) that also indicates the start times for respective ones of the multiple engines.

Clause 17: A computer-readable storage medium for supporting taxi operation of an aircraft at an airport, the aircraft with fuel-consuming systems comprising multiple engines, the computer-readable storage medium being non-transitory and having computer-readable program code stored therein that, in response to execution by processing circuitry, causes an apparatus to at least: receive information that indicates a predicted taxi duration of a taxi operation of a flight of the aircraft, and that indicates weather conditions at the airport; determine whether a reduced-engine taxi operation (RETO) of the aircraft is permitted based on the predicted taxi duration and the weather conditions; and when RETO of the aircraft is permitted, determine a fuel savings of RETO in which at least a portion of the taxi operation is performed with less than all of the multiple engines of the aircraft running, relative to a normal taxi operation in which the taxi operation is performed with all of the multiple engines of the aircraft running; and output a recommendation of RETO or normal taxi operation to a display device onboard the aircraft, the recommendation of RETO when the fuel savings is at least a given minimum fuel savings.

Clause 18: The computer-readable medium of Clause 17, wherein the information comprises standard operations procedures (SOP) of the airport, and determining whether RETO of the aircraft is permitted comprises determining whether the airport permits RETO from the SOP.

Clause 19: The computer-readable medium of any of Clauses 17-18, wherein the information indicates the predicted taxi duration comprising a queue duration in which the aircraft is standing, and the information further indicates an engine-warmup duration, and an aircraft weight, and wherein determining the fuel savings comprises: applying the predicted taxi duration, the queue duration and the aircraft weight to first models trained to predict and thereby produce first predictions of fuel burn for respective ones of the fuel-consuming systems for the normal taxi operation; applying the predicted taxi duration, the queue duration, the engine-warmup duration and the aircraft weight to second models trained to predict and thereby produce second predictions of fuel burn for respective ones of the fuel-consuming systems for RETO; calculating a first prediction of total fuel burn for the normal taxi operation from the first predictions, and a second prediction of total fuel burn for RETO from the second predictions; and determining a difference between the first prediction of total fuel burn and the second prediction of total fuel burn that indicates the fuel savings of RETO relative to normal taxi operation.

Clause 20: The computer-readable medium of any of Clauses 17-19, wherein the fuel-consuming systems of the aircraft also comprise an auxiliary power unit (APU), the first models are trained to predict and thereby produce the first predictions of fuel burn for respective ones of the multiple engines and the APU for the normal taxi operation, and the second models are trained to predict and thereby produce the second predictions of fuel burn for respective ones of the multiple engines and the APU for RETO.

Clause 21: The computer-readable medium of any of Clauses 17-20, wherein the taxi operation is a taxi-out operation that comprises taxi of the aircraft from a given gate to a given runway of the airport, and the information further indicates the airport, the given gate, and the given runway, and wherein the first models and the second models are specific to the airport, the given gate and the given runway, the first models trained to predict and thereby produce the first predictions of fuel burn for respective ones of the fuel-consuming systems for the normal taxi operation from the given gate to the given runway, and the second models trained to predict and thereby produce the second predictions of fuel burn for respective ones of the fuel-consuming systems for RETO from the given gate to the given runway.

Clause 22: The computer-readable medium of any of Clauses 17-21, wherein the aircraft is of a given type of aircraft, and wherein the first models and the second models are specific to the given type of aircraft, the first models trained to predict and thereby produce the first predictions of fuel burn for respective ones of the fuel-consuming systems for the normal taxi operation of the given type of aircraft, and the second models trained to predict and thereby produce the second predictions of fuel burn for respective ones of the fuel-consuming systems for RETO of the given type of aircraft.

Clause 23: The computer-readable medium of any of Clauses 17-22, wherein outputting the recommendation comprises facilitating a presentation of the recommendation via a graphical user interface (GUI) that also indicates the second predictions of fuel burn for respective ones of the fuel-consuming systems when the recommendation is RETO, and that indicates the first predictions of fuel burn for respective ones of the fuel-consuming systems when the recommendation is the normal taxi operation.

Clause 24: The computer-readable medium of any of Clauses 17-23, wherein the taxi operation is a taxi-out operation, and the information further indicates a pushback time of the aircraft from a gate of the airport, and an engine-warmup duration, wherein the processing circuitry is configured to execute the computer-readable program code to cause the apparatus to further at least determine start times for respective ones of the multiple engines from the pushback time, and further from the predicted taxi time and the engine-warmup duration when the recommendation is RETO, and wherein outputting the recommendation comprises facilitating a presentation of the recommendation via a graphical user interface (GUI) that also indicates the start times for respective ones of the multiple engines.

Many modifications and other implementations of the disclosure set forth herein will come to mind to one skilled in the art to which the disclosure pertains having the benefit of the teachings presented in the foregoing description and the associated figures. Therefore, it is to be understood that the disclosure is not to be limited to the specific implementations disclosed and that modifications and other implementations are intended to be included within the scope of the appended claims. Moreover, although the foregoing description and the associated figures describe example implementations in the context of certain example combinations of elements and/or functions, it should be appreciated that different combinations of elements and/or functions can be provided by alternative implementations without departing from the scope of the appended claims. In this regard, for example, different combinations of elements and/or functions than those explicitly described above are also contemplated as can be set forth in some of the appended claims. To the extent that terms "includes," "including," "has," "contains," and variants thereof are used herein, such terms are intended to be inclusive in a manner similar to the term "comprises" as an open transition word without precluding any additional or other elements. Although specific terms are employed herein, they are used in a generic and descriptive sense only and not for purposes of limitation.

What is claimed is:

1. A method that supports taxi operation of an aircraft at an airport, the aircraft with fuel-consuming systems comprising multiple engines, the method comprising:

receiving, by a system comprising a processor, information that indicates a predicted taxi duration of a taxi operation of a flight of the aircraft, wherein the information further indicates the predicted taxi duration comprising a queue duration in which the aircraft is standing, and the information further indicates an engine-warmup duration, and an aircraft weight, and the information further indicates weather conditions at the airport;

determining, by the processor, whether a reduced-engine taxi operation (RETO) of the aircraft is permitted based on the predicted taxi duration and the weather conditions; and when RETO of the aircraft is permitted, determining, by the processor, a fuel savings of RETO in which at least a portion of the taxi operation is performed with less than all of the multiple engines of the aircraft running, relative to a normal taxi operation in which the taxi operation is performed with all of the multiple engines of the aircraft running, wherein determining the fuel savings comprises:

applying, by the processor, the predicted taxi duration, the queue duration and the aircraft weight to first models trained to predict and thereby produce first predictions of fuel burn for respective ones of the fuel-consuming systems for the normal taxi operation;

applying, by the processor, the predicted taxi duration, the queue duration, the engine-warmup duration and the aircraft weight to second models trained to predict and thereby produce second predictions of fuel burn for respective ones of the fuel-consuming systems for RETO;

calculating, by the processor, a first prediction of total fuel burn for the normal taxi operation from the first predictions, and a second prediction of total fuel burn for RETO from the second predictions; and determining, by the processor, a difference between the first prediction of total fuel burn and the second prediction of total fuel burn that indicates the fuel savings of RETO relative to the normal taxi operation;

outputting, by the processor, a recommendation of RETO or normal taxi operation to a display device and a control system onboard the aircraft based on the fuel savings;

automatically performing RETO, by the control system, when the fuel savings is at least a given minimum fuel savings;

calculating a time to start and/or stop the less than all of the multiple engines;

calculating a position at which the less than all of the multiple engines is started or stopped; and recommending the time and the position at which the less than all of the multiple engines are started or stopped based on the recommendation of RETO.

2. The method of claim 1, wherein the information comprises standard operations procedures (SOP) of the airport, and the determining whether RETO of the aircraft is permitted comprises determining whether the airport permits RETO from the SOP.

3. The method of claim 1, wherein the fuel-consuming systems of the aircraft also comprise an auxiliary power unit (APU), the first models are trained to predict and thereby produce the first predictions of fuel burn for respective ones of the multiple engines and the APU for the normal taxi operation, and the second models are trained to predict and thereby produce the second predictions of fuel burn for respective ones of the multiple engines and the APU for RETO.

4. The method of claim 1, wherein the taxi operation is a taxi-out operation that comprises taxi of the aircraft from a given gate to a given runway of the airport, and the information further indicates the airport, the given gate, and the given runway, and wherein the first models and the second models are specific to the airport, the given gate and the given runway, the first models trained to predict and thereby produce the first predictions of fuel burn for respective ones of the fuel-consuming systems for the normal taxi operation from the given gate to the given runway, and the second models trained to predict and thereby produce the second predictions of fuel burn for respective ones of the fuel-consuming systems for RETO from the given gate to the given runway.

5. The method of claim 1, wherein the aircraft is of a given type of aircraft, and wherein the first models and the second models are specific to the given type of aircraft, the first models trained to predict and thereby produce the first predictions of fuel burn for respective ones of the fuel-consuming systems for the normal taxi operation of the given type of aircraft, and the second models trained to predict and thereby produce the second predictions of fuel burn for respective ones of the fuel-consuming systems for RETO of the given type of aircraft.

6. The method of claim 1, wherein outputting the recommendation comprises outputting the recommendation via a graphical user interface (GUI) that also indicates the second predictions of fuel burn for respective ones of the fuel-consuming systems when the recommendation is RETO, and that indicates the first predictions of fuel burn for respective ones of the fuel-consuming systems when the recommendation is the normal taxi operation.

7. The method of claim 1, wherein the taxi operation is a taxi-out operation, and the information further indicates a pushback time of the aircraft from a gate of the airport, and the engine-warmup duration, wherein the method further comprises determining start times for respective ones of the multiple engines from the pushback time, and further from a predicted taxi time and the engine-warmup duration when the recommendation is RETO, and wherein outputting the recommendation comprises outputting the recommendation via a graphical user interface (GUI) that also indicates the start times for respective ones of the multiple engines.

8. An apparatus for supporting taxi operation of an aircraft at an airport, the aircraft with fuel-consuming systems comprising multiple engines, the apparatus comprising:

a memory configured to store computer-readable program code; and processing circuitry configured to access the memory, and execute the computer-readable program code to cause the apparatus to at least:

receive information that indicates a predicted taxi duration of a taxi operation of a flight of the aircraft, wherein the information indicates the predicted taxi duration comprising a queue duration in which the aircraft is standing, and the information further indicates an engine-warmup duration, and an aircraft weight, and the information further indicates weather conditions at the airport;

determine whether a reduced-engine taxi operation (RETO) of the aircraft is permitted based on the predicted taxi duration and the weather conditions; and when RETO of the aircraft is permitted, determine a fuel savings of RETO in which at least a portion of the taxi operation is performed with less than all of the multiple engines of the aircraft running, relative to a normal taxi operation in which the taxi operation is performed with all of the multiple engines of the aircraft running, wherein determining the fuel savings comprises:

applying the predicted taxi duration, the queue duration and the aircraft weight to first models trained to predict and thereby produce first predictions of fuel burn for respective ones of the fuel-consuming systems for the normal taxi operation;

applying the predicted taxi duration, the queue duration, the engine-warmup duration and the aircraft weight to second models trained to predict and thereby produce second predictions of fuel burn for respective ones of the fuel-consuming systems for RETO;

calculating a first prediction of total fuel burn for the normal taxi operation from the first predictions, and a second prediction of total fuel burn for RETO from the second predictions; and determining a difference between the first prediction of total fuel burn and the second prediction of total fuel burn that indicates the fuel savings of RETO relative to the normal taxi operation;

output a recommendation of RETO or normal taxi operation to a display device and a control system onboard the aircraft based on the fuel savings;

transmit instructions to the control system to automatically perform RETO when the fuel savings is at least at a given minimum fuel savings;

calculate a time to start and/or stop the less than all of the multiple engines;

calculate a position at which the less than all of the multiple engines is started or stopped; and recommend the time and the position at which the less than all of the multiple engines are started or stopped based on the recommendation of RETO.

9. The apparatus of claim 8, wherein the information comprises standard operations procedures (SOP) of the airport, and determining whether RETO of the aircraft is permitted comprises determining whether the airport permits RETO from the SOP.

10. The apparatus of claim 8, wherein the fuel-consuming systems of the aircraft also comprise an auxiliary power unit (APU), the first models are trained to predict and thereby produce the first predictions of fuel burn for respective ones of the multiple engines and the APU for the normal taxi operation, and the second models are trained to predict and thereby produce the second predictions of fuel burn for respective ones of the multiple engines and the APU for RETO.

11. The apparatus of claim 8, wherein the taxi operation is a taxi-out operation that comprises taxi of the aircraft from a given gate to a given runway of the airport, and the information further indicates the airport, the given gate, and the given runway, and wherein the first models and the second models are specific to the airport, the given gate and the given runway, the first models trained to predict and thereby produce the first predictions of fuel burn for respective ones of the fuel-consuming systems for the normal taxi operation from the given gate to the given runway, and the second models trained to predict and thereby produce the second predictions of fuel burn for respective ones of the fuel-consuming systems for RETO from the given gate to the given runway.

12. The apparatus of claim 8, wherein the aircraft is of a given type of aircraft, and wherein the first models and the second models are specific to the given type of aircraft, the first models trained to predict and thereby produce the first predictions of fuel burn for respective ones of the fuel-consuming systems for the normal taxi operation of the given type of aircraft, and the second models trained to predict and thereby produce the second predictions of fuel burn for respective ones of the fuel-consuming systems for RETO of the given type of aircraft.

13. The apparatus of claim 8, wherein outputting the recommendation comprises facilitating a presentation of the recommendation via a graphical user interface (GUI) that also indicates the second predictions of fuel burn for respective ones of the fuel-consuming systems when the recommendation is RETO, and that indicates the first predictions of fuel burn for respective ones of the fuel-consuming systems when the recommendation is the normal taxi operation.

14. The apparatus of claim 8, wherein the taxi operation is a taxi-out operation, and the information further indicates a pushback time of the aircraft from a gate of the airport, and the engine-warmup duration, wherein the processing circuitry is configured to execute the computer-readable program code to cause the apparatus to further at least determine start times for respective ones of the multiple engines from the pushback time, and further from a predicted taxi time and the engine-warmup duration when the recommendation is RETO, and wherein outputting the recommendation comprises facilitating a presentation of the recommendation via a graphical user interface (GUI) that also indicates the start times for respective ones of the multiple engines.

15. A computer-readable storage medium for supporting taxi operation of an aircraft at an airport, the aircraft with fuel-consuming systems comprising multiple engines, the computer-readable storage medium being non-transitory and having computer-readable program code stored therein that, in response to execution by processing circuitry, causes an apparatus to at least:

receive information that indicates a predicted taxi duration of a taxi operation of a flight of the aircraft, wherein the information indicates the predicted taxi duration comprising a queue duration in which the aircraft is standing, and the information further indicates an engine-warmup duration, and an aircraft weight, and the information further indicates weather conditions at the airport;

determine whether a reduced-engine taxi operation (RETO) of the aircraft is permitted based on the predicted taxi duration and the weather conditions; and when RETO of the aircraft is permitted, determine a fuel savings of RETO in which at least a portion of the taxi operation is performed with less than all of the multiple engines of the aircraft running, relative to a normal taxi operation in which the taxi operation is performed with all of the multiple engines of the aircraft running, wherein determining the fuel savings comprises:

applying the predicted taxi duration, the queue duration and the aircraft weight to first models trained to predict and thereby produce first predictions of fuel burn for respective ones of the fuel-consuming systems for the normal taxi operation;

applying the predicted taxi duration, the queue duration, the engine-warmup duration and the aircraft weight to second models trained to predict and thereby produce second predictions of fuel burn for respective ones of the fuel-consuming systems for RETO;

calculating a first prediction of total fuel burn for the normal taxi operation from the first predictions, and a second prediction of total fuel burn for RETO from the second predictions; and determining a difference between the first prediction of total fuel burn and the second prediction of total fuel burn that indicates the fuel savings of RETO relative to the normal taxi operation;

output a recommendation of RETO or normal taxi operation to a display device and a control system onboard the aircraft based on the fuel savings;

transmit instructions to the control system to automatically perform RETO when the fuel savings is at least a given minimum fuel savings;

calculate a time to start and/or stop the less than all of the multiple engines;

calculate a position at which the less than all of the multiple engines is started or stopped; and recommend the time and the position at which the less than all of the multiple engines are started or stopped based on the recommendation of RETO.

16. The computer-readable storage medium of claim 15, wherein the information comprises standard operations procedures (SOP) of the airport, and determining whether RETO of the aircraft is permitted comprises determining whether the airport permits RETO from the SOP.

17. The computer-readable storage medium of claim 15, wherein the fuel-consuming systems of the aircraft also comprise an auxiliary power unit (APU), the first models are trained to predict and thereby produce the first predictions of fuel burn for respective ones of the multiple engines and the APU for the normal taxi operation, and the second models are trained to predict and thereby produce the second predictions of fuel burn for respective ones of the multiple engines and the APU for RETO.

* * * * *